United States Patent
Lessard

(10) Patent No.: US 7,381,337 B2
(45) Date of Patent: Jun. 3, 2008

(54) GEL-BASED REMEDIAL ADDITIVE FOR REMEDIATION OF ENVIRONMENTAL MEDIA AND METHOD OF USE

(75) Inventor: Lawrence H. Lessard, Marblehead, MA (US)

(73) Assignee: Lessard Environmental, Inc., Danvers, MA (US)

(*) Notice: Subject to any disclaimer, the term of this patent is extended or adjusted under 35 U.S.C. 154(b) by 281 days.

(21) Appl. No.: 10/892,969

(22) Filed: Jul. 16, 2004

(65) Prior Publication Data

US 2005/0011830 A1  Jan. 20, 2005

Related U.S. Application Data

(60) Provisional application No. 60/488,524, filed on Jul. 17, 2003.

(51) Int. Cl.
 *C03F 3/00* (2006.01)
(52) U.S. Cl. .................. 210/758; 210/759; 210/760
(58) Field of Classification Search .. 435/252.1–253.6; 210/758–760
 See application file for complete search history.

(56) References Cited

U.S. PATENT DOCUMENTS

| | | | |
|---|---|---|---|
| 3,796,637 A | 3/1974 | Fusey | |
| 4,591,443 A | 5/1986 | Brown | |
| 6,103,685 A | 8/2000 | Hall | |
| 6,110,446 A | 8/2000 | Afflitto et al. | |
| 6,455,751 B1* | 9/2002 | Hoffman et al. | 588/320 |
| 6,569,353 B1 | 5/2003 | Hitchens et al. | |
| 6,992,048 B2* | 1/2006 | Reddy et al. | 507/202 |
| 7,179,381 B2* | 2/2007 | Sorenson, Jr. | 210/610 |
| 2003/0004067 A1* | 1/2003 | Chatterji et al. | 507/200 |
| 2005/0163729 A1* | 7/2005 | Zaidel et al. | 424/53 |

OTHER PUBLICATIONS http://www.lessard-environmental.com/aboutLEI/index.html downloaded Apr. 19, 2007.*

* cited by examiner

*Primary Examiner*—Chester T Barry
(74) *Attorney, Agent, or Firm*—Michael J. Brown

(57) ABSTRACT

The invention is a formulation for remedial additives to be introduced into environmental medium, where the formulation is designed to reduce unwanted movement through the environmental medium. The formulation includes an inorganic thickening agent to adjust viscosity and a diluent, in addition to components for chemical and/or bioremediation.

7 Claims, No Drawings

GEL-BASED REMEDIAL ADDITIVE FOR REMEDIATION OF ENVIRONMENTAL MEDIA AND METHOD OF USE

CROSS-REFERENCE TO RELATED APPLICATION

This application claims priority from U.S. provisional patent application No. 60/488,524, filed Jul. 17, 2003.

FIELD OF INVENTION

The present invention relates to treatment contamination within environmental media, such as soil, groundwater, sediment or bedrock. More particularly the invention relates to a formulation for remedial additives and a method of introducing the formulation into the environmental medium. As a result of this process, the overall efficiency of the treatment process is improved as compared to the existing art of remedial additive injection.

BACKGROUND OF INVENTION

Contamination of soil and groundwater by various compounds including both organic and inorganic chemicals is widespread. This contamination threatens human health, public safety, public welfare and the environment. Attempts to remediate contaminated soil or groundwater by a variety of means are common.

One common technique for decontaminating aquifers that is in current use is the pump-and-treat method. As practiced, this method utilizes a series of extraction wells drilled into a contaminated aquifer. Contaminated water is drawn through an extraction well, treated to remove or degrade the contaminant, and then returned to the aquifer through one or more injection wells or discharged to sewers or other points of non-origin. This method can be time consuming and cost-prohibitive.

Two other existing in situ methods of remediation of contaminated soil or groundwater are chemical treatment and biological treatment. Typically, chemical treatment consists of oxidation or reduction of the contaminants via application of remedial additives which can include, but are not limited to, hydrogen peroxide, Fenton's Reagent, ozone, sodium persulfate, sodium or potassium permanganate or lactate. Typically biological treatment consists of stimulating microorganisms that are either naturally occurring at the treatment location or microorganisms that are introduced into the treatment area. Stimulation is achieved by altering nutrient and electron acceptor concentrations in a manner that is beneficial to the microorganisms.

The efficiency of both chemical and biological treatment largely depends on the remedial additives being in contact with the contaminants in the environmental media being treated. Existing methods of applying remedial additives typically relies on groundwater dispersion of the remedial additives from the point of introduction or release, where the groundwater flow may travel beyond the target area. Accordingly, the remedial additives are, in part, transported to locations other than those locations targeted for remedial action. This groundwater transport most commonly results from advection and dispersion in water. The large-scale dispersion reduces the efficacy of the chemical or biological treatment of the contaminants because the dispersed remedial additives are no longer co-located with the contaminants and further reduces the efficacy of the treatment as the dispersion reduces the concentrations of the remedial additives.

Additional complexity in remedial treatment results from the existence of contaminants that have limited solubility in water, such as petroleum hydrocarbons or halogenated hydrocarbons. In the environmental remediation field, petroleum hydrocarbons typically refer to, but are not limited to, gasoline, oils, petroleum solvents such as benzene and various synthetic additives commonly used in gasoline or oils. Halogenated hydrocarbons are compounds composed of hydrogen and carbon with at least one hydrogen substituted by a halogen atom (e.g. Cl, Br, or F). Halogenated hydrocarbons are used for many purposes, such as solvents, pesticides, and degreasers. Degreasing products have widespread use in several industries, including dry cleaning, microelectronics, and equipment maintenance. Some of the most common halogenated hydrocarbons are methylene chloride, chloroform, carbon tetrachloride, tetrachloroethene (PCE), trichloroethene (TCE), 1,1,1-trichloroethane (TCA), dichloroethene (DCE), and vinyl chloride (VC). Such compounds are commonly known as "chlorinated hydrocarbons" or "chlorinated solvents."

The limited solubility of petroleum hydrocarbons or halogenated hydrocarbons and density differential between water and either petroleum hydrocarbons or halogenated hydrocarbons greatly complicates environmental remediation. When released these compounds migrate as a non-aqueous liquid through soil, sediment or bedrock under density-driven flow. The compounds will migrate in a manner that is controlled by their density and the heterogeneities of the media they are migrating through. The compounds will, to varying degrees, interact with water present. In the case of the petroleum hydrocarbons, which are typically less dense than water, they will migrate vertically through the soil, sediment or bedrock and follow a pathway of least resistance until a zone of high water saturation is encountered. Migration will then have a significantly reduced vertical migration component and an increased horizontal component. The petroleum hydrocarbons will tend to accumulate immediately above the zone of increased water saturation. In the case of a groundwater system, this will be on water table or immediately above the water table, in the zone of partial saturation commonly referred to as the capillary fringe. In the case of halogenated hydrocarbons, which are typically denser than water, the vertical migration of these compounds is not substantially impeded by the presence of the water table. Vertical migration continues controlled primarily on density flow and heterogeneities in the subsurface medium.

Both petroleum hydrocarbons and halogenated hydrocarbons can be present in environmental media as Non-Aqueous Phase Liquids (NAPLs). In the case of NAPL compounds that are less dense than water, such compounds are referred to as "Lighter NAPLs" or "LNAPLs." In the case of compounds that are denser than water, such compounds are called "Dense NAPLs" or "DNAPLs." NAPLs can be found on a large scale as LNAPLs floating on the groundwater table in a measurable thickness or as DNAPLs which accumulate on a stratigraphic feature either above or below the groundwater table. On a smaller scale NAPLs can be found adsorbed to individual soil grains or on other subsurface structures.

Both chemical oxidation and bioremediation are less successful in the vadose zone soils located above the water table. This is in part due to the water-based remedial additives used in these methods being placed subsurface, resulting in these remedial additives draining through the vadose zone soils. Such drainage does not allow sufficient contact time between the remedial additives and the contaminated soils for optimal remedial effects. In contaminated soil or groundwater located below the groundwater table, the groundwater itself dilutes and disperses the remedial additives.

The drainage and/or dispersion can also result is less efficient treatment; in part because the remedial additives may be transported to locations where little or no contamination is present, as well as reducing the concentration of the remedial additives where they are most desired. This decreases the efficiency of both chemical oxidation and bioremediation in permeable sediments and bedrock.

Another problem with the inefficient dispersion in existing methods and formulations is that the introduction of remedial additives in uncontaminated media can degrade groundwater and/or soil quality, or under some circumstances, can contaminate previously unaffected areas.

In U.S. Pat. No. 4,591,443, Brown and Norris provide for a method of altering the viscosity of a chemical oxidation formulation by adding hydratable polymeric material. Hydratable polymeric materials are commonly used in well drilling and other industries to control the viscosity of liquids. However, the various polymeric materials that are utilized in the '443 patent have limitations. Some of the polymers identified in the '443 patent have limited thermal stability: above certain temperatures, the viscosity modifiers lose their beneficial properties. In efforts to avoid this the '443 patent proposes use of various cross-linking compounds. Both the polymeric materials and the cross-linking compounds as identified in the '443 patent can themselves be environmental contaminants. These compounds can also react with, and therefore reduce the efficiency of, the chemical oxidation reactants that they are designed to deliver. The '443 patent does not disclose viscosity modification as being potentially beneficial to bioremediation efforts. This lack of disclosure may be because the viscosity modifiers proposed in '443 can either cause additional oxygen demand as they degrade or be toxic to the microorganisms necessary for bioremediation, thus reducing the efficiency of or preventing bioremediation. In fact, some or all of the viscosity modifying agents proposed under '443 may themselves be viewed as environmental contaminants and require subsequent removal or treatment. This subsequent need for removal or treatment can eliminate or reduce any efficiency in the treatment of the original contaminants.

The present invention provides an improvement over the limitations of '443 and an extension of viscosity modification to treatments other than chemical oxidation.

It is the object of the present invention to provide an improved formulation for remedial additives to be introduced into environmental medium.

It is another object of the present invention to overcome the shortcomings and inefficiencies of prior art remedial additive introduced into a variety of environmental media.

It is another object of the present invention to improve the efficiency of chemical treatment, biological treatment or the integration of the two by allowing the remedial additives to be focused in the desired treatment zone. This focusing results from the viscosity of the formulation, the dissolution of the formulation over time and the ability to introduce the formulation in a manner that follows preferential migration pathways in the environmental media.

It is another object of the present invention to improve efficiency of remediation by formulating remedial additives that can be made to migrate through environmental media in a manner similar to contaminants, thereby better co-locating of the remedial additives with the contaminants to be treated.

It is another object of the present invention to provide a formulation that allows greater control over the placement of the remedial additives than is otherwise possible.

It is another object of the present invention to provide a formulation for remediation of contaminated areas that reduces the likelihood of accidental contamination of previously uncontaminated environmental media.

It is another object of the present invention to provide a formulation for remediation of contaminated areas that reduces the need for post-remediation cleanup of the formulation itself.

It is yet another objective of the present invention to provide an improved, safer, more cost-efficient method for remediation of environmental contaminants.

SUMMARY OF THE INVENTION

The present invention relates to compounds characterized by their ability to release chemical and biological remedial additives over time, where the remedial compounds have an additional component which assists in controlling the location and movement of the compounds through environmental media. The present invention also relates to formulations comprising the compounds, as well as their use in aiding chemical treatment and/or bioremediation of media impacted by contaminants capable of being remediated by chemical treatment, microbial reduction or an integration of the two.

DETAILED DESCRIPTION

The present invention provides a remediation formulation comprising 1-50% by weight of an oxidizing agent, 0.01-50% by weight of an inorganic thickening agent, as needed to adjust viscosity, 1-35% by weight inorganic salts and 1-90% by weight of a diluent. Preferably the oxidizing agent is selected from the group consisting of hydrogen peroxide, sodium or potassium permanganate, sodium persulfate, calcium hydroxide or magnesium hydroxide. Preferably the thickening agent is a silica based material such as silica fume. Preferably, the diluent is selected from the group consisting of water or nutrient amended water. In other embodiments, the formulations above further comprise 0-30% by weight of one or more biostimulants selected from the following: yeast extract, urea, potassium-containing compositions, nitrogen-containing compositions, phosphorous-containing compositions, sulfur-containing compositions, molybdenum salts, iron salts, zinc salts, copper salts, ethylene, chelating agents, surfactants, vitamins such as $B_{12}$, enzymes such as lipase and esterase, and bacteria and other microbes. The use of such biostimulants is well-known in the art for biological remediation.

In the case of a chemical oxidation application, the preferred formulation of the invention contains hydrogen peroxide at a concentration of 50% percent by weight. The oxidant is diluted in water with a final hydrogen peroxide concentration in the range of 5 to 35 percent by weight. This oxidant is thickened with a silica based material, such as silica fume to achieve the desired viscosity. The desired viscosity will vary depending upon the particular conditions in the area being treated. Prior to establishing the viscosity of the formulation, the conditions at the treatment area would be evaluated.

In one example, an area that has permeable subsurface materials, such as coarse sand, which are contaminated with petroleum, the prior art method of chemical oxidation injections would involve introducing an oxidant, usually hydrogen peroxide, into the soil. Because of the high permeability of the coarse sand, the oxidant would migrate quickly through the soil resulting in short contact time between the oxidant and the soil. Treatment would either be incomplete or require greater volumes of oxidant than would be required if the oxidant did not migrate through the soil or migrated at a slower rate. Such migration is reduced by modifying the viscosity of the remedial additives with the formulation presented herein. The thicker formulation would move more slowly under the force of gravity and contact time with the contaminated soil would be increased.

The use of the invention in this instance would involve a formulation that achieved viscosity increases from the normal viscosity of hydrogen peroxide (less than 2 centistokes) to a viscosity similar to a light oil (10 to 40 centistokes).

When the formulation of the invention is applied subsurface, the remedial additives will move more slowly through soil than with prior art applications, resulting in greater efficacy and efficiency than known in the prior art.

In a second example, a subsurface zone is contaminated by chlorinated solvents. The contamination is concentrated above a stratigraphic unit of lower permeability, below the water table. In prior art, remedial additives with viscosities similar to water would be introduced into this zone. Groundwater flow would cause migration of the remedial additives out of the contaminated zone prior to completion of the desired remedial action. Application of the invention in this case would involve addition of a silica based material, such as silica fume as a thickening agent to achieve a viscosity in the range of 10 to 100 centistokes. The actual viscosity would be determined by evaluating the nature of the impacted stratigraphic unit and the velocity of groundwater flow.

In the case of bioremediation, a preferred formulation of the invention contains 0.1 to 5% hydrogen peroxide, 4% nitrogen, 4% phosphate, 4% potash, 5% cultured, contaminant degrading microbes, 4% biostimulants in water. The mixture is thickened with a silica based material, such as silica fume to achieve a desired viscosity. The examples given above would also apply to the final formulation of the bioremediation additive.

The present invention can also be utilized in existing methods of chemical or biological treatment of contaminants within a medium through direct chemical oxidation and/or through bioremediation of contaminants. Remediation is aided through chemical oxidation and microbial activity in a medium, comprising contacting the medium with applying a composition comprising of a gel formulated as described above. The medium is preferably selected from the group consisting of an aquifer, a bioreactor, soil, an industrial process, a waste stream, a body of water, a river, and a well. When the medium is underground, the method of bioremediation may comprise injecting the composition or formulation into the medium with a high pressure pump or via gravity. Another method comprises the steps of packing the composition into tubes or canisters having holes or slits in the sides thereof, and placing the canisters into holes drilled into the ground.

Another method of remediation of chemical compositions in a medium comprises a method of applying a remedial additive gel to the contaminated medium. The remedial additive is comprised of chemical, biological or a combination thereof remedial compositions set in a gel form through the use of a silica based thickening agent, such as silica fume. Preferably the contaminants are selected from the group consisting of petroleum or halogenated hydrocarbons as described herein. The medium is preferably selected from the group consisting of an aquifer, a bioreactor, soil, an industrial process, a waste stream, a body of water, a river and a well. The remedial additive gel is applied to the contaminated medium.

Silica based thickening agents are preferred, as silica is a common constituent element of soil and bedrock and does not introduce yet another foreign compound into the already contaminated medium, which would then have to be removed after remediation. The silica may remain on site after remediation. Silica fume is the preferred form of silica for use in the present invention due to the fine particulate size, in which silica fume is commonly available, allows for the silica fume to be easily combined with remedial additives.

While certain novel features of the present invention have been shown and described, it will be understood that various omissions, substitutions and changes in the forms and details of the device illustrated and in its operation can be made by those skilled in the art without departing from the spirit of the invention.

I claim:

1. A method for remediation of an environmental medium, said environmental medium being contaminated with a contaminant, the method comprising the steps of:
   evaluating the nature of the environmental medium as to at least one of its soil and groundwater characteristics;
   evaluating the nature of the contaminant;
   determining the appropriate remediation for the environmental medium;
   formulating a remedial additive appropriate for the contaminant and the environmental medium, where the remedial additive is comprised of an oxidizing agent, inorganic salts and a diluent,
   adding an inorganic thickening agent to the formulated remedial additive, said inorganic thickening agent capable of controlling the dispersion of the formulated remedial additive through the environmental medium; and
   applying the remedial additive and inorganic thickening agent to the environmental medium.

2. The method of claim 1, where the inorganic thickening agent is a silica based material.

3. The method of claim 2, where the silica based material is silica fume.

4. The method of claim 1, where the remedial additive is a chemical oxidation formulation.

5. The method of claim 1, where the remedial additive further comprises a biostimulant between 0 and 30% by weight.

6. A composition for use in the remediation of contaminated soil or groundwater at a pre-evaluated site, said formulation comprised of:
   an oxidizing agent between 1 and 50% by weight;
   an inorganic thickening agent between 0.01 and 50% by weight;
   inorganic salts between 1 and 35% by weight; and
   a diluent between 1 and 90% by weight,
where the oxidizing agent hydrogen peroxide at a concentration between 0.1 and 5% by weight; and further comprising nitrogen at 4%; phosphate at 4%; potash at 4%; cultured microbes at 5%; and a biostimulant at 4%.

7. The composition of claim 6, where the biostimulant is selected from a group consisting of yeast extract, urea, potassium-containing compositions, nitrogen-containing compositions, phosphorous-containing compositions, sulfur-containing compositions, molybdenum salts, iron salts, zinc salts, copper salts, ethylene, chelating agents, surfactants, vitamins, enzymes, bacteria and microbes and mixtures thereof.

* * * * *